US005602922A

United States Patent [19]

Lee

[11] Patent Number: 5,602,922

[45] Date of Patent: Feb. 11, 1997

[54] METHOD AND APPARATUS FOR PROCESSING AN AUDIO SIGNAL BY SURROUND MODES

[75] Inventor: Young-Man Lee, Suwon, Rep. of Korea

[73] Assignee: Samsung Electronics Co., Ltd., Kyungki-do, Rep. of Korea

[21] Appl. No.: 292,020

[22] Filed: Aug. 18, 1994

[30] Foreign Application Priority Data

Aug. 19, 1993 [KR] Rep. of Korea .................. 16139/1993

[51] Int. Cl.$^6$ .................................................. H04N 5/91

[52] U.S. Cl. .................................................. 381/18; 381/22

[58] Field of Search .......................................... 381/17–23

[56] References Cited

U.S. PATENT DOCUMENTS 5,027,687 7/1991 Iwamatsu .................................. 381/18
5,128,999 7/1992 Yanagawa ................................. 381/22
5,155,770 10/1992 Maejima ................................... 381/22
5,164,840 11/1992 Kawamura et al. ....................... 381/18
5,261,005 11/1993 Masayuki .................................. 381/18

*Primary Examiner*—Stephen Brinich
*Attorney, Agent, or Firm*—Sughrue, Mion, Zinn, Macpeak & Seas

[57] ABSTRACT

The present invention relates to an audio signal processing apparatus and method, and more particularly to an apparatus and method for processing an audio signal according to surround modes in which a surround-sound of an original sound, in accordance with surround modes, can be reproduced by carrying surround code information with the audio signal being transmitted and by detecting the surround code information upon receipt of the audio signal. An apparatus for processing an audio signal having a transmitting device which transmits the audio signal and a receiving device which surround-processes the audio signal and outputs the surround-processed audio signal, including a device for generating a surround discriminating signal indicating a surround mode corresponding to the audio signal, a mixer for mixing the surround discriminating signal with the audio signal, a separator for separating the surround discriminating signal from the audio signal, a surround mode detector for detecting the surround mode from the surround discriminating signal separated from the separator and a surround processor for surround-processing the audio signal in response to the detection result of the surround mode.

10 Claims, 4 Drawing Sheets

METHOD AND APPARATUS FOR PROCESSING AN AUDIO SIGNAL BY SURROUND MODES

BACKGROUND OF THE INVENTION

The present invention relates to an audio signal processing apparatus, and more particularly, to an apparatus and method for processing an audio signal according to surround modes, in which a surround-sound of an original sound timbre can be reproduced in accordance with a particular surround mode by carrying surround code information with the audio signal being transmitted, and by detecting the surround code information upon receipt of the audio signal.

In general, many audio apparatuses which have a surround circuit capable of producing the surround-sound of a current sound, i.e. a feeling of a sound field where an original sound timbre is produced for a listener, are installed have become popular. Unlike a stereo system, a surround-sound system is capable of reproducing a feeling of a sound field by generating an inherent reflected sound responsive to an audio signal.

FIG. 1 shows an audio apparatus in which the surround circuit is installed, which is disclosed in Korean patent application 92-7759 filed by the applicant of the present invention. A surround unit 14 has a plurality of surround circuits 14*a*, 14*b*, and 14*c* which delay the audio signal applied from the left and right audio input terminals L and R, in order to represent different surround-sound effects. A switch 16 connects one of the surround circuits 14*a*, 14*b*, or 14*c* to left and right surround exclusive speakers SSP1 and SSP2. A controller 18, for example, a microcomputer, controls the switch 16. A sound adjuster 10 adjusts a base, balance, treble, and volume of the audio signal, and then outputs the adjusted audio signal through speakers SP1 and SP2. An amplifier 12, connected to output terminals of the sound adjustor 10, amplifies the audio signal supplied to the speakers SP1 and SP2.

The audio apparatus shown in FIG. 1 can advantageously provide a variable surround-sound effect to a user by having a plurality of surround circuits installed in which each surround circuit generates a surround-sound effect that is different from the others.

However, the audio apparatus shown in FIG. 1 is inconvenient to use. This is because the surround circuits which generate a surround-sound effect corresponding to a particular surround-sound characteristic, such as a sound produced in a studio, concert hall, playground, theater, etc., should be individually selected by a user in accordance with the desired surround-sound characteristic.

Moreover, when the surround-sound characteristic of the desired surround circuit selected by the user does not match the surround-sound characteristic of the desired original sound, the desired surround-sound effect can not be fully generated.

SUMMARY OF THE INVENTION

It is therefore an object of the present invention to provide a method for processing an audio signal by automatically selecting a surround mode corresponding to a surround-sound characteristic of a desired original sound.

Another object of the present invention is to provide an apparatus to perform the method for processing an audio signal, as mentioned above.

To achieve these objects, the present invention provides a method of processing an audio signal in which the audio signal is transmitted by a transmitting side and the audio signal is surround-processed in a receiving side. The method comprises the steps of transmitting surround-sound information indicating a surround method appropriate for the audio signal, along with the audio signal; receiving the audio signal and surround-sound information; processing the audio signal according to the transmitted surround-sound information; and reproducing the audio signal processed according to the surround-sound information.

Further to achieve these objects, the present invention provides an apparatus for processing an audio signal having a transmitting device which transmits the audio signal and a receiving device which surround-processes the audio signal, the apparatus comprising: a transmitter for transmitting the audio signal with surround-sound information; a receiver for receiving the transmitted audio signal with surround-sound information; a processor for processing the transmitted audio signal according to the surround-sound information; and a device for reproducing the audio signal processed according to the surround-sound information.

BRIEF DESCRIPTION OF THE DRAWINGS

These and other objects, features, and advantages of the present invention are better understood by reading the following detailed description of the invention, taken in conjunction with the accompanying drawings. In the drawings, it should be noted that like symbols or reference numerals represent like elements, wherein.

DETAILED DESCRIPTION OF THE PREFERRED EMBODIMENTS

Figure 1:
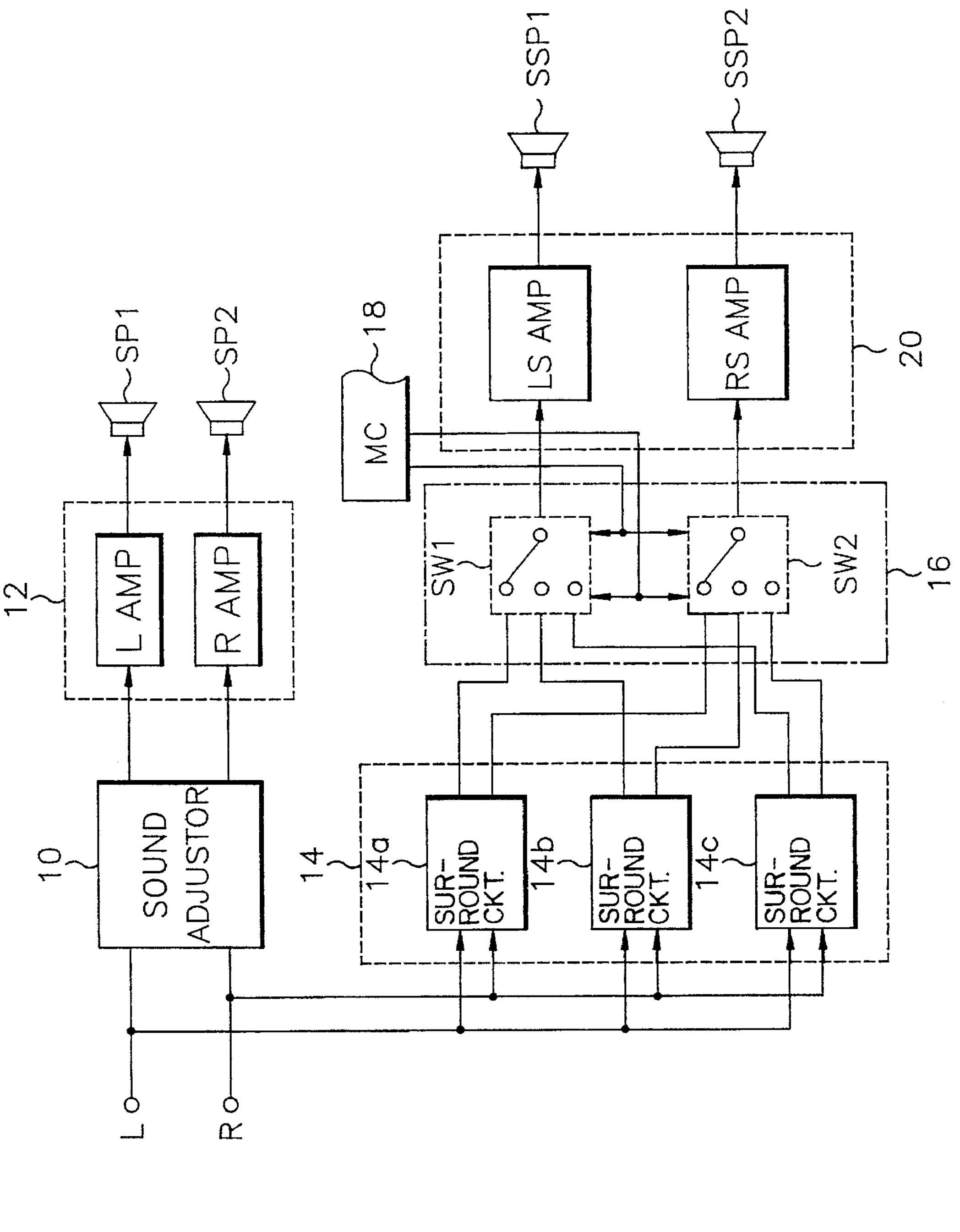
FIG. 1 is a block diagram showing a conventional audio apparatus having a surround processor.
Figure 2A:
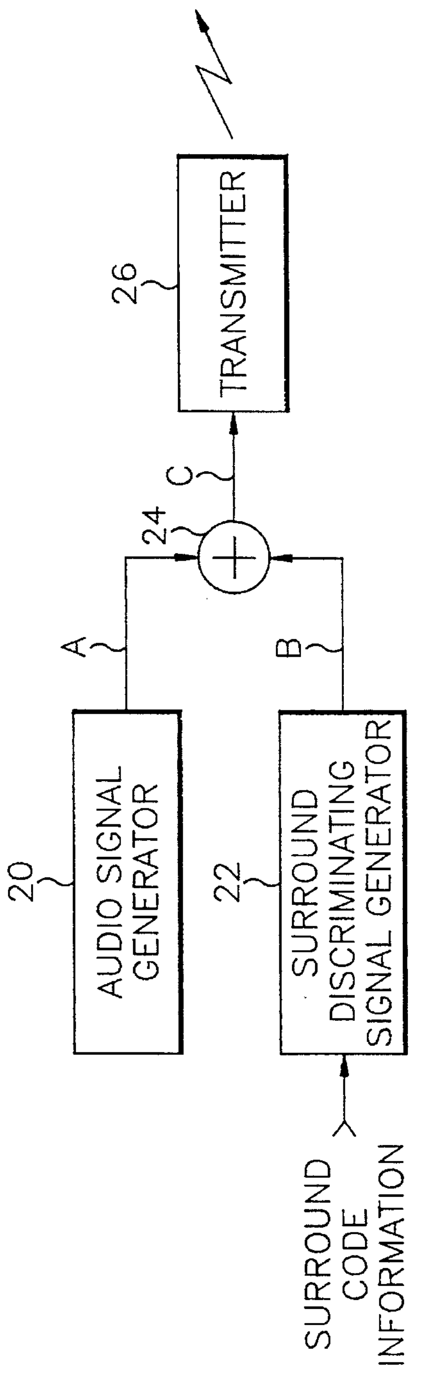
FIGS. 2A and 2B are block diagrams showing an apparatus for processing transmission/reception of an audio signal according to the present invention.
Figure 2B:
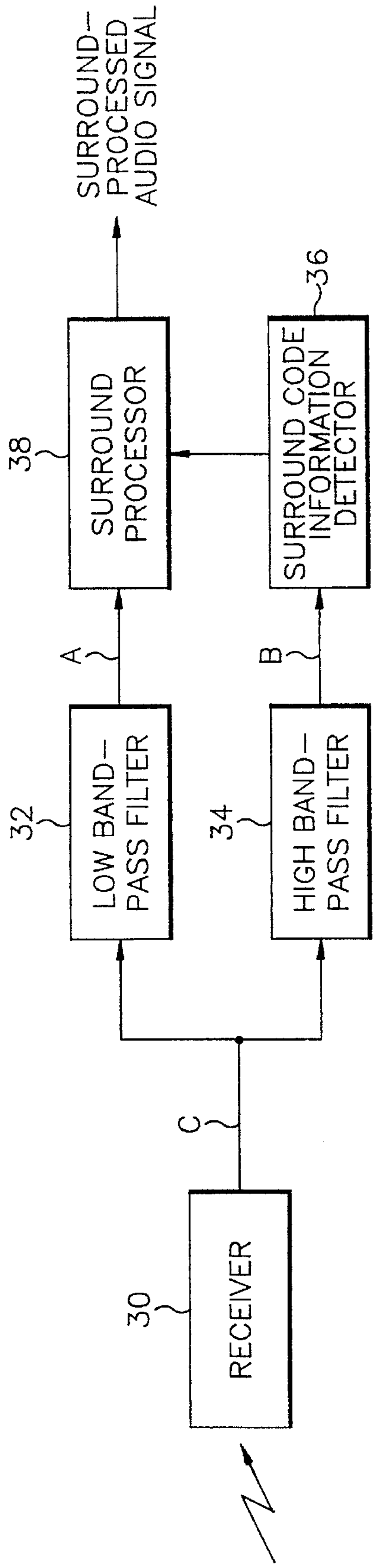

FIGS. 2A and 2B are block diagrams showing a preferred embodiment of an apparatus for transmitting, receiving and processing an audio signal according to the present invention. FIG. 2A shows a transmitting device having an audio signal generator 20 for generating an audio signal and a surround discriminating signal generator 22 which frequency-modulates surround code information according to the audio signal. A mixer 24 mixes the frequency-modulated surround code information with the audio signal and outputs the mixed signal to a transmitter 26.

FIG. 2B shows a receiving device having a receiver 30 and a high band-pass filter 34 which passes a high frequency bandwidth to extract the surround code information in a received signal. Further, a low band-pass filter 32 which passes a low frequency bandwidth, extracts the audio signal in the received signal, and a surround code information detector 36 detects the surround code information. A surround processor 38 assigns a particular surround-sound in accordance with the detected surround code information.

FIGS. 3A to 3D are waveform diagrams showing the operation of the devices shown in FIG. 2. Hereinafter, details of the operation of these devices will be explained with reference to FIGS. 3A to 3D.

An example of an embodiment of the invention as shown in FIG. 2 is a television system. In a transmitting side of the television system, such as a television broadcast station, an audio signal and a video signal are processed through separate paths and converted into a radio frequency (RF) signal and transmitted. Hereinafter, since explanation of processing of a video signal of FIG. 2A may require deviation from the scope of the present invention, it will be avoided in order to explicitly concentrate the explanation on the audio signal of the present invention.

Figures 3A, 3B, 3C, 3D:
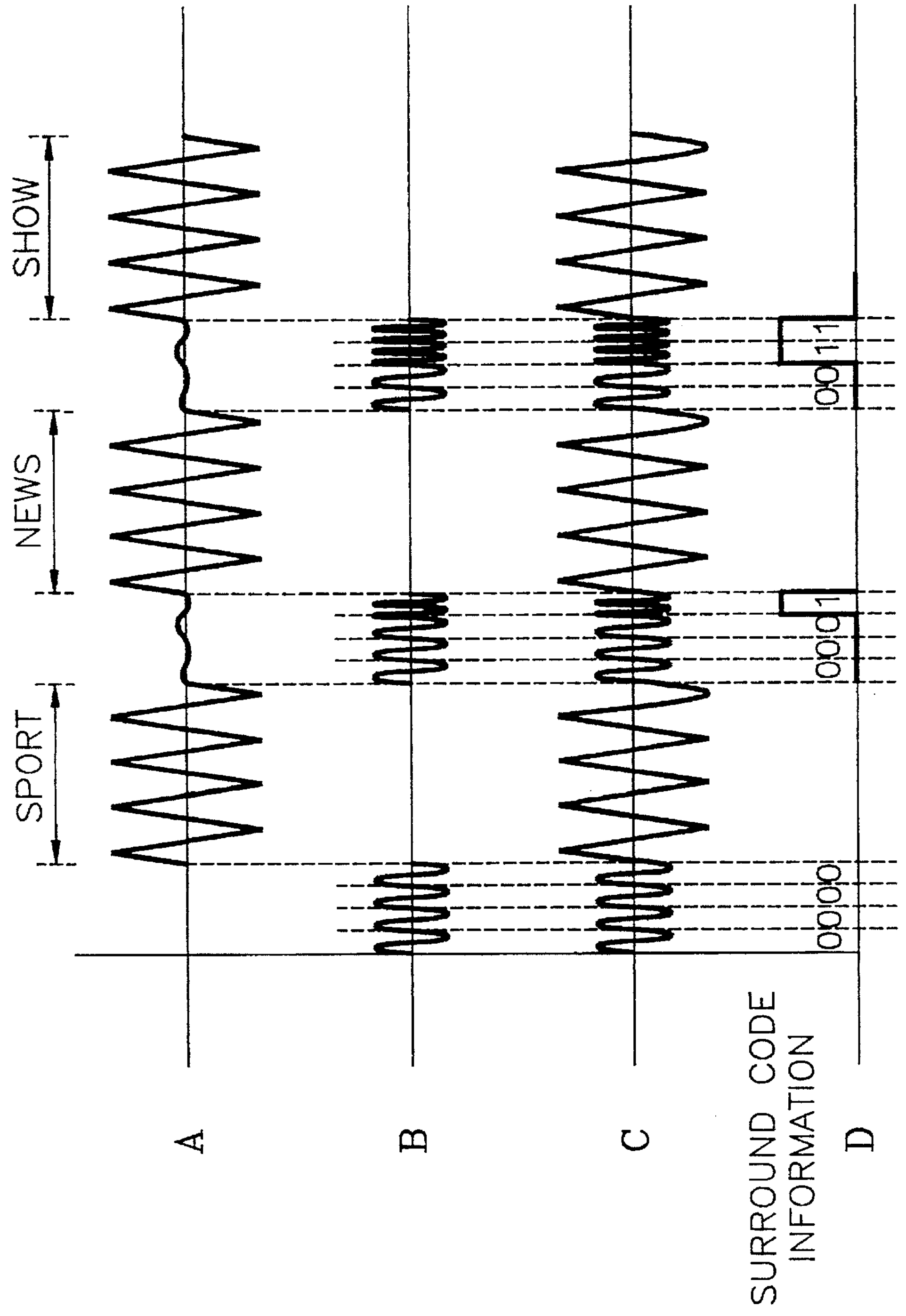
FIGS. 3A to 3D are waveform diagrams showing input/output states of the apparatus for processing the audio signal of FIG. 2.

FIG. 3A shows audio signal waveforms output from an audio signal generator 20 in a transmitting side of a broadcasting station, which may be that of a news program produced in a studio or hall, a show performed in a concert hall, or a sporting event played in a stadium or at a playground.

The surround code information corresponding to a broadcast program shown in FIG. 3A, is applied to the surround discriminating signal generator 22 in the transmitting side of the broadcasting station. The surround code information is composed of digital binary values transmitted as a preset bit, which is a bit previously coordinated with the transmitting and receiving sides of the television system. The surround discriminating signal generator 22 modulates the surround code information, which represents the surround-sound characteristic, onto an analog signal, as shown in FIG. 3B. The modulated analog signal is then applied to mixer 24.

FIG. 3B shows a modulated surround discriminating signal produced from the surround code information respectively corresponding to the different places (i.e., sporting event, news studio, theater, etc.) indicated in FIG. 3A. Here, for example, when the binary value of the surround code information is "0", the frequency of the surround discriminating signal is 30 KHz. On the other hand, when the binary value of the surround code information is "1", the frequency of the surround discriminating signal is 40 KHz. It is apparent to those skilled in the art that the frequency bandwidth of the surround discriminating signal is arbitrarily variable, within the limits that it does not interfere with the frequency bandwidth of the original audio signal.

An example of surround code information classification is shown in by the following table, labeled Table 1.

TABLE 1

| SURROUND CODE INFORMATION | PLACE CORRESPONDING TO SURROUND CODE INFORMATION |
|---|---|
| 0 0 0 0 | CONCERT HALL 1 |
| 0 0 0 1 | CONCERT HALL 2 |
| 0 0 1 0 | PLAYGROUND |
| . | . |
| . | . |
| . | . |
| 1 1 1 1 | THEATER |

The audio signal and the surround discriminating signal, respectively output from the audio signal generator 20 and the surround discriminating signal generator 22, are mixed in mixer 24. The resultant waveform is shown in FIG. 3C. The mixed signal output from mixer 24 is applied to transmitter 26. Transmitter 26 converts the mixed signal in accordance with the format of the television signal, to thereby transmit the converted television signal to the receiving side of a television system, such as a television receiver.

In the receiving device, shown in FIG. 2B, the mixed signal transmitted from transmitter 26 of FIG. 2A is received by receiver 30. The mixed signal received by receiver 30 contains both the audio signal and the surround discriminating signal. Next, the audio signal is extracted through low band-pass filter 32 and, simultaneously, the surround discriminating signal is extracted through high band-pass filter 34. Since the surround discriminating signal uses frequencies of 30 KHz and 40 KHz, in the present example, the low band-pass filter 32 and the high band-pass filter 34 have a cut-off frequency of 30 KHz. Preferably, the cut-off frequencies of the low and high band-pass filters 32 and 34 should not overlap each other.

Surround code information detector 36 detects the surround code information, which is shown in FIG. 3D, from the surround discriminating signal output from the high band-pass filter 34, and then outputs the surround code information to surround processor 38. The surround processor 38 then performs surround-processing on the audio signal output from low band-pass filter 32 in accordance with the surround code information output from surround code information detector 36, in order to output a surround-processed audio signal. It should be noted that in the surround processor 38, the surround mode corresponding to the surround code information is based on a jointly agreed to scheme between the transmitting and receiving sides of the television system, where specific codes refer to specific surround modes. Thus, the surround processor 38 can automatically output the surround-processed audio signal corresponding to the correct surround mode without requiring the user to select the surround mode, as is required in a conventional surround-sound system.

Figure 4:
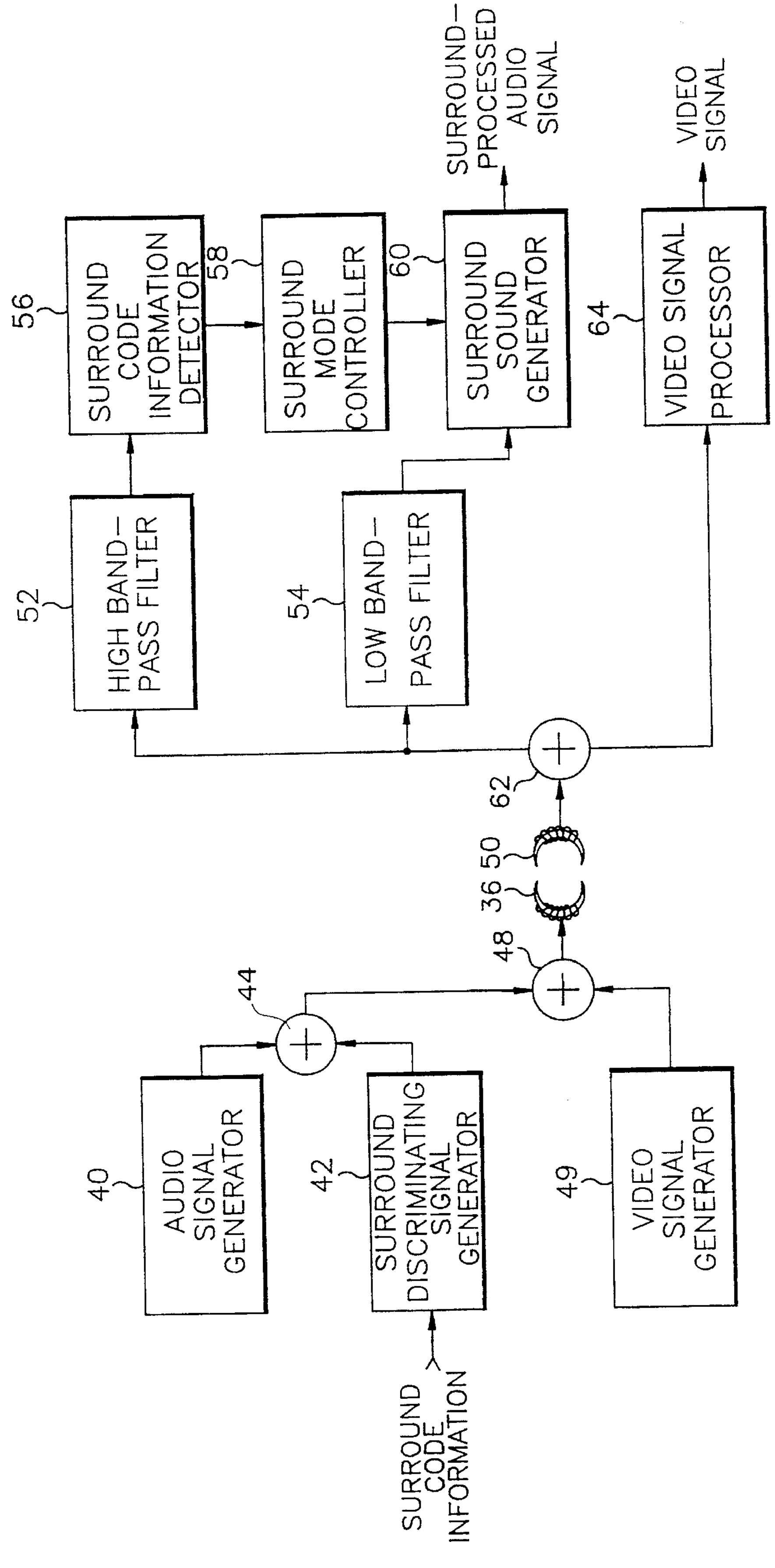
FIG. 4 is a block diagram showing an embodiment of an apparatus for processing an audio signal according to the present invention.

FIG. 4 shows an apparatus for processing the transmission/reception of an audio signal according to the present invention embodied in a video recorder. Details of the process of recording the audio/video signals will hereinafter be explained with reference to FIG. 4.

The surround discriminating signal generated from a surround discriminating signal generator 42 and the audio signal generated from an audio signal generator 40 are mixed in a mixer 44. The mixed signals are frequency-modulated in a modulator 48 to be recorded in a tape (not shown) through a recording head 36.

The audio/video signals recorded as set forth above, are reproduced through the following process.

The audio/video signals recorded on the tape are read through a playback head 50. The audio signal mixed with the surround discriminating signal, and the video signal are respectively demodulated through a demodulator 62. Here, the audio signal, which is mixed with the surround discriminating signal, is demodulated in demodulator 62 and then separated into an audio signal and a surround discriminating signal via high band-pass filter 52 and low band-pass filter 54. The surround discriminating signal output from the high band-pass filter 52 is applied to the surround code information detector 56, and the audio signal output from the low band-pass filter 54 is applied the surround-sound generator 60. The surround code information detector 56 detects the surround code information from the surround discriminating signal output from the low band-pass filter 54, and thereby, a surround mode controller 58 controls a surround-sound generator 60 in correspondence with the surround code information. The surround mode controller 58 can employ a microcomputer, wherein the surround mode corresponding to the surround code information has been determined. The surround mode controller 58 thereby outputs a surround mode signal corresponding to the surround code information. Then, the surround-sound generator 60 assigns a given surround-sound to the audio signal output from the low band-pass filter 54 in response to the surround mode signal output from the surround mode controller 58, and then outputs a surround-processed audio signal. A video signal processor 64 processes the video signal separated in the demodulator 62. Through such a reproducing process, it is understood that the original surround-sound recorded on the video recording tape is reproduced like the surround-sound of the original sound.

As hereinbefore explained, an apparatus and method for processing an audio signal by surround modes according to the present invention has an advantage of reproducing an original surround-sound by transmitting or recording a surround discriminating signal, indicating a surround mode, with the audio signal, and by detecting or reproducing the surround discriminating signal to control the surround mode.

What is claimed is:

1. A method for processing an audio signal, in which the audio signal is transmitted by a transmitting side and the audio signal is surround-processed in a receiving side, said method comprising the steps of:

- generating a single mixed signal by modifying said audio signal with surround-sound information indicating a surround-sound characteristic of an original sound timbre in the transmitting side, wherein said audio signal is modified by including said surround-sound information in said audio signal;
- transmitting said single mixed signal in the transmitting side and receiving said single mixed signal in the receiving side;
- separating said single mixed signal into one or more than one signal, said more than one signal including said audio signal and said surround-sound information; and
- surround-processing said audio signal into an audio signal having the surround-sound characteristic indicated by said surround-sound information.

2. The method for processing an audio signal as claimed in claim 1, wherein said surround-sound information is a binary logic signal comprising a predetermined number of bits and is frequency-modulated upon transmission and is frequency-demodulated upon reception.

3. The method for processing an audio signal as claimed in claim 2, wherein said surround-sound information is modulated in a higher frequency bandwidth than a frequency bandwidth of said audio signal.

4. The method for processing an audio signal as claimed in claim 2, wherein said surround code information has a frequency of 30 KHz to 40 KHz after modulation and before demodulation.

5. The method for processing an audio signal as claimed in claim 2, wherein said surround-sound information is included with said audio signal to generate said single mixed signal by superimposing said surround-sound information on said audio signal.

6. The apparatus for processing an audio signal as claimed in claim 5, wherein said surround-sound processing means comprises a surround-sound generator for generating a given surround-sound for said audio signal, and a surround mode controller for controlling said surround-sound generator in response to said detected surround mode.

7. The apparatus for processing an audio signal as claimed in claim 5, wherein said transmitting device is a television broadcast station, and said receiving device is a television receiver.

8. An apparatus for processing an audio signal having a transmitting device which transmits the audio signal and a receiving device which surround-processes the audio signal, said apparatus comprising:

- means for generating a surround discriminating signal indicating a surround mode corresponding to the audio signal of original sound;
- means for generating a single mixed signal by modifying said audio signal with said surround discriminating signal and outputting said single mixed audio signal;
- separating means for separating said single mixed signal into more than one signal, said more than one signal including said surround discriminating signal and said audio signal;
- surround mode detector for detecting a surround mode from said surround discriminating signal separated by said separating means; and
- surround-sound processing means for surround-processing said separated audio signal in response to said detected surround mode.

9. The apparatus for processing an audio signal as claimed in claim 8, wherein said mixing means outputs said single mixed audio signal formed by superimposing said surround discriminating signal on said audio signal.

10. The apparatus for processing an audio signal as claimed in claim 6, wherein said transmitting device is a video tape recorder, and said receiving device is a video tape player.

* * * * *